US009237331B2

(12) United States Patent
Heinzle et al.

(10) Patent No.: US 9,237,331 B2
(45) Date of Patent: Jan. 12, 2016

(54) COMPUTATIONAL STEREOSCOPIC CAMERA SYSTEM

(75) Inventors: Simon Heinzle, Burbank, CA (US); Pierre Greisen, Zürich (CH); Aljoscha Smolic, Burbank, CA (US); Wojciech Matusik, Burbank, CA (US); Markus Gross, Burbank, CA (US)

(73) Assignees: DISNEY ENTERPRISES, INC., Burbank, CA (US); ETH ZÜRICH (EIDGENÖESSISCHE TECHNISCHE HOCHSCHULE ZÜRICH), Zürich (CH)

( * ) Notice: Subject to any disclaimer, the term of this patent is extended or adjusted under 35 U.S.C. 154(b) by 403 days.

(21) Appl. No.: 13/083,483

(22) Filed: Apr. 8, 2011

(65) Prior Publication Data

US 2012/0182397 A1     Jul. 19, 2012

Related U.S. Application Data

(60) Provisional application No. 61/433,937, filed on Jan. 18, 2011.

(51) Int. Cl.
*H04N 13/02* (2006.01)
*G06T 7/00* (2006.01)
*H04N 13/00* (2006.01)

(52) U.S. Cl.
CPC ............ *H04N 13/0239* (2013.01); *G06T 7/002* (2013.01); *G06T 7/0018* (2013.01);
(Continued)

(58) Field of Classification Search
CPC .............. H04N 13/02; H04N 13/0203; H04N 13/0239; H04N 13/0242; H04N 13/0246; H04N 13/0296; G06T 7/002; G06T 7/0018

USPC ...................................................... 348/46, 47
See application file for complete search history.

(56) References Cited

U.S. PATENT DOCUMENTS 4,562,463 A * 12/1985 Lipton ............................ 348/56
4,879,596 A * 11/1989 Miura et al. .................... 348/47
(Continued)

FOREIGN PATENT DOCUMENTS

EP         1089573 B1 *  5/2008
JP    EP 2448244 A1 *  5/2012  ................ G06T 5/50

OTHER PUBLICATIONS

Spencer Yip, "Hands on with the Nintendo 3DS' 3D Camera", Siliconera, Jun. 21 2010, http://www.siliconera.com/2010/05/21/hands-on-with-the-nintendo-3ds-3d-camera/.*
(Continued)

*Primary Examiner* — Dave Czekaj
*Assistant Examiner* — David N Werner
(74) *Attorney, Agent, or Firm* — Kilpatrick Townsend & Stockton LLP

(57) ABSTRACT

A closed-loop control system for stereoscopic video capture is provided. At least two motorized lenses are positioned in accordance with specified parameters to capture spatially-disparate images of a scene. The motorized lenses focus light on a corresponding one of the at least two sensors, which generate image streams. One or more processors execute instructions to provide a stream analyzer and a control module. The stream analyzer receives the image streams from the sensors and analyzes the image streams and the specified parameters in real time; the stream analyzer then modifies the image streams and generates metadata. The control module then receives and analyzes the image streams and metadata and transmits updated parameters to a control mechanism that is coupled to the at least two motorized lenses. The control mechanism then modifies operation of the at least two motorized lenses in real time in accordance with the updated parameters.

34 Claims, 14 Drawing Sheets
(8 of 14 Drawing Sheet(s) Filed in Color)

(52) U.S. Cl.
CPC ....... *H04N13/0246* (2013.01); *H04N 13/0296* (2013.01); *H04N 13/00* (2013.01); *H04N 13/02* (2013.01); *H04N 13/0242* (2013.01)

(56) References Cited

U.S. PATENT DOCUMENTS

| | | | | |
|---|---|---|---|---|
| 4,881,122 | A * | 11/1989 | Murakami | 348/47 |
| 5,063,441 | A * | 11/1991 | Lipton et al. | 348/47 |
| 5,142,357 | A * | 8/1992 | Lipton et al. | 348/48 |
| 5,486,860 | A * | 1/1996 | Shiokawa et al. | 348/354 |
| 5,557,410 | A * | 9/1996 | Huber et al. | 356/604 |
| 5,561,526 | A * | 10/1996 | Huber et al. | 356/604 |
| 5,577,991 | A * | 11/1996 | Akui et al. | 600/111 |
| 5,668,595 | A * | 9/1997 | Katayama et al. | 348/218.1 |
| 5,677,728 | A * | 10/1997 | Schoolman | 348/14.15 |
| 6,512,892 | B1 * | 1/2003 | Montgomery | H04N 13/0011 348/E13.008 |
| 6,689,998 | B1 * | 2/2004 | Bremer | 250/201.2 |
| 6,798,406 | B1 * | 9/2004 | Jones | H04N 13/0011 345/419 |
| 7,084,838 | B2 * | 8/2006 | Yoon | 345/6 |
| 7,576,795 | B2 * | 8/2009 | Silverbrook | 348/345 |
| 9,025,007 | B1 * | 5/2015 | Parsons | H04N 13/0246 345/419 |
| 2001/0045979 | A1 * | 11/2001 | Matsumoto et al. | 348/43 |
| 2002/0141635 | A1 * | 10/2002 | Swift | G06T 7/0022 382/154 |
| 2002/0158984 | A1 * | 10/2002 | Brodsky | H04N 13/0217 348/340 |
| 2003/0107643 | A1 * | 6/2003 | Yoon | 348/47 |
| 2003/0107645 | A1 * | 6/2003 | Yoon | 348/51 |
| 2003/0107646 | A1 * | 6/2003 | Yoon | 348/51 |
| 2005/0053274 | A1 * | 3/2005 | Mayer et al. | 382/154 |
| 2008/0049100 | A1 * | 2/2008 | Lipton et al. | 348/43 |
| 2010/0039502 | A1 * | 2/2010 | Robinson | G06T 7/0075 348/47 |
| 2010/0097444 | A1 * | 4/2010 | Lablans | 348/46 |
| 2010/0208034 | A1 * | 8/2010 | Chen | G06T 7/0022 348/46 |
| 2010/0238272 | A1 * | 9/2010 | Cameron | H04N 13/0239 348/47 |
| 2010/0247088 | A1 * | 9/2010 | Campbell | H04N 13/0239 396/325 |
| 2010/0328427 | A1 * | 12/2010 | Sakano | G06T 7/0075 348/43 |
| 2011/0050944 | A1 * | 3/2011 | Nakamura | H04N 5/772 348/222.1 |
| 2011/0228051 | A1 * | 9/2011 | Dedeoglu | H04N 13/0022 348/46 |
| 2011/0243543 | A1 * | 10/2011 | Pace | G03B 35/08 396/325 |
| 2011/0299761 | A1 * | 12/2011 | Myokan | G01B 11/26 382/154 |
| 2012/0062707 | A1 * | 3/2012 | Seo | H04N 13/0239 348/47 |
| 2012/0140038 | A1 * | 6/2012 | Bi | H04N 13/0022 348/46 |
| 2012/0249750 | A1 * | 10/2012 | Izzat | G06T 7/0022 348/47 |
| 2012/0320048 | A1 * | 12/2012 | Yamashita | G03B 35/08 345/419 |
| 2012/0327191 | A1 * | 12/2012 | Yamashita | G03B 21/56 348/46 |
| 2012/0327197 | A1 * | 12/2012 | Yamashita | G03B 35/08 348/50 |

OTHER PUBLICATIONS

J.S. Lewinski, "Inside the Scene-Stealing 3-D Technology Behind James Cameron's Avatar", Popular Science (online), Dec. 17, 2009, http://www.popsci.com/technology/article/2009-12/feature-3-d-revolution.*

3ALITYDIGITAL, 3flex: TS Beam Splitter Rigs and Stereoscopic Image Processors, 1 page. Retrieved on May 4, 2011 from http://www.3alitydigital.com/3flex.

Adams, A., et al., "The Frankencamera: An Experimental Platform for Computational Photography", Association for Computer Machinery (ACM) Transactions of Graphics, Proceedings of ACM SIGGRAPH, New York, NY, Jul. 2010, vol. 29, Issue 4, 12 pages.

Babenko, B., et al., "Visual Tracking With Online Multiple Instance Learning", 2009 IEEE Conference on Computer Vision and Pattern Recognition (CVPR), Miami, FL, USA, Jun. 20, 2009, pp. 983-990.

Bouguet, J.-Y., "Camera Calibration Toolbox for Matlab", 2010, 5 pages. Retrieved on Mar. 28, 2011 from http:/www.vision.caltech.edu/bouguetj/calib_doc/.

Brown, D. C., "Decentering Distortion of Lenses", Photogrammetric Engineering, May 1966, vol. 32, No. 3, pp. 444-462, 20 total pages (including cover page), Published by The American Society of Photogrammetry, Falls Church, VA, USA.

Foundry, T., Ocula Stereoscopic Post-production Plug-ins for Nuke, 2 pages. Retrieved on May 4, 2011 from http://thefoundry.co.uk/products/ocula.

Fraser, C. S., et al, "Zoom-Dependent Camera Calibration in Digital Close-Range Photogrammetry", Photogrammetric Engineering & Remote Sensing, vol. 72, No. 9, Sep. 2006, pp. 1017-1026.

Hoffman, D., et al., "Vergence-Accommodation Conflicts Hinder Visual Performance and Cause Visual Fatigue", Journal of Vision, Mar. 28, 2008, vol. 8, No. 3, Article No. 33, pp. 1-30.

Jones, G., et al., "Controlling Perceived Depth in Stereoscopic Images", Stereoscopic Displays and Virtual Reality Systems VIII, Jun. 2001, The International Society for Optics and Photonics (SPIE) Proceedings vol. 4297, pp. 42-53.

Kawai, T., et al., "Development of Software for Editing of Stereoscopic 3-D Movies", Stereoscopic Displays and Virtual Reality Systems IX, May 2002, Proceedings of SPIE vol. 4460, pp. 58-65.

Koppal, S., et al., "A Viewer-Centric Editor for 3D Movies", IEEE Computer Graphics and Applications, Jan./Feb. 2011, vol. 31, Issue 1, pp. 20-35.

Lang, M., et al., "Nonlinear Disparity Mapping for Stereoscopic 3D", ACM Transactions on Graphics, Los Angeles, CA, USA, Jul. 2010, vol. 29, No. 3, 10 pages.

Stereotec, Stereoscopic Calculator, 4 pages. Retrieved on May 4, 2011 from http://www.stereotec.com/products.html.

Mallon, J., et al., "Projective Rectification From The Fundamental Matrix", Image Vision Computing, Feb. 2, 2005, vol. 23, No. 7, pp. 643-650.

Malvar, H., et al., "High-Quality Linear Interpolation for Demosaicing of Bayer-Patterned Color Images", International Conference on Acoustics, Speech and Signal Processing (ICASSP), Montreal, Quebec, Canada, May 17-21, 2004, vol. 3, pp. 485-488.

Masaoka, K., "Spatial Distortion Prediction System for Stereoscopic Images", Journal of Electronic Imaging, Jan.-Mar. 2006, vol. 15, No. 1, pp. 013002-1 to 013002-12.

Mendiburu, B., "3D Movie Making—Stereoscopic Digital Cinema From Script to Screen", Focal Press, Burlington, MA, USA / Elsevier, Inc., Oxford, UK, 2009, 232 pages.

Mueller, R., et al., "A Systematized WYSIWYG Pipeline for Digital Stereoscopic 3D Filmmaking", Stereoscopic Displays and Applications XIX, Proceedings of SPIE—Electronic Imaging, San Jose, CA, USA, Jan. 29, 2008, vol. 6803, 68030V, pp. 68030V-1 to 68030V-12.

Pitié, F., et al., "Automated Colour Grading Using Colour Distribution Transfer", Computer Vision and Image Understanding, 2007, vol. 107, pp. 123-137.

Ramanath, R., et al., "Color Image Processing Pipeline", Signal Processing Magazine, IEEE, Jan. 2005, vol. 22, Issue 1, pp. 34-43.

Sony, MPE200 Multi Image Processor, 4 pages. Retrieved on Mar. 28, 2011 from http://pro.sony.com/bbsc/ssr/cat-switchersdandrouters/cat-switchers/product-MPE200/.

Sun, G., et al., "Evaluating Methods for Controlling Depth Perception in Stereoscopic Cinematography", Stereoscopic Displays and Applications XX, Proceedings SPIE—Electronic Imaging, SPIE vol. 7237, 72370I, Feb. 17, 2009, 72370I-1 to 72370I-12.

Wang, C., et al., "Disparity Manipulation for Stereo Images and Video", Stereoscopic Displays and Applications XIX, Proceedings of SPIE—Electronic Imaging, San Jose, CA, USA, Jan. 29, 2008, SPIE vol. 6803, 68031E, pp. 68031E-1 to 68031E-12.

(56) References Cited

OTHER PUBLICATIONS

Zach, C., et al., "Hierarchical Disparity Estimation With Programmable 3D Hardware", WSGC Short Communication papers proceedings, WSCG International Conference in Central Europe on Computer Graphics, Visualization and Computer Vision, WSCG 2004, Plzen, Slowakei (Slovakia), Feb. 2-6, 2004, pp. 275-282.

Zilly, F., et al., "Real-time Analysis and Correction of Stereoscopic HDTV Sequences", Proceedings of European Conference on Visual Media Production (CVMP), London, UK, Nov. 2009, 1 page.

Zilly, F., et al., "Joint Estimation of Epipolar Geometry and Rectification Parameters Using Point Correspondences for steroscopic TV Sequences", Proceedings of 3DPVT, Paris, France, May 2010, 7 pages.

Zilly, F., et al., "The Stereoscopic Analyzer—An Image-Based Assistance Tool for Stereo Shooting and 3D Production", Proceedings of IEEE 17th International Conference on Image Processing, Hong Kong, Sep. 26-29, 2010, pp. 4029-4032.

* cited by examiner

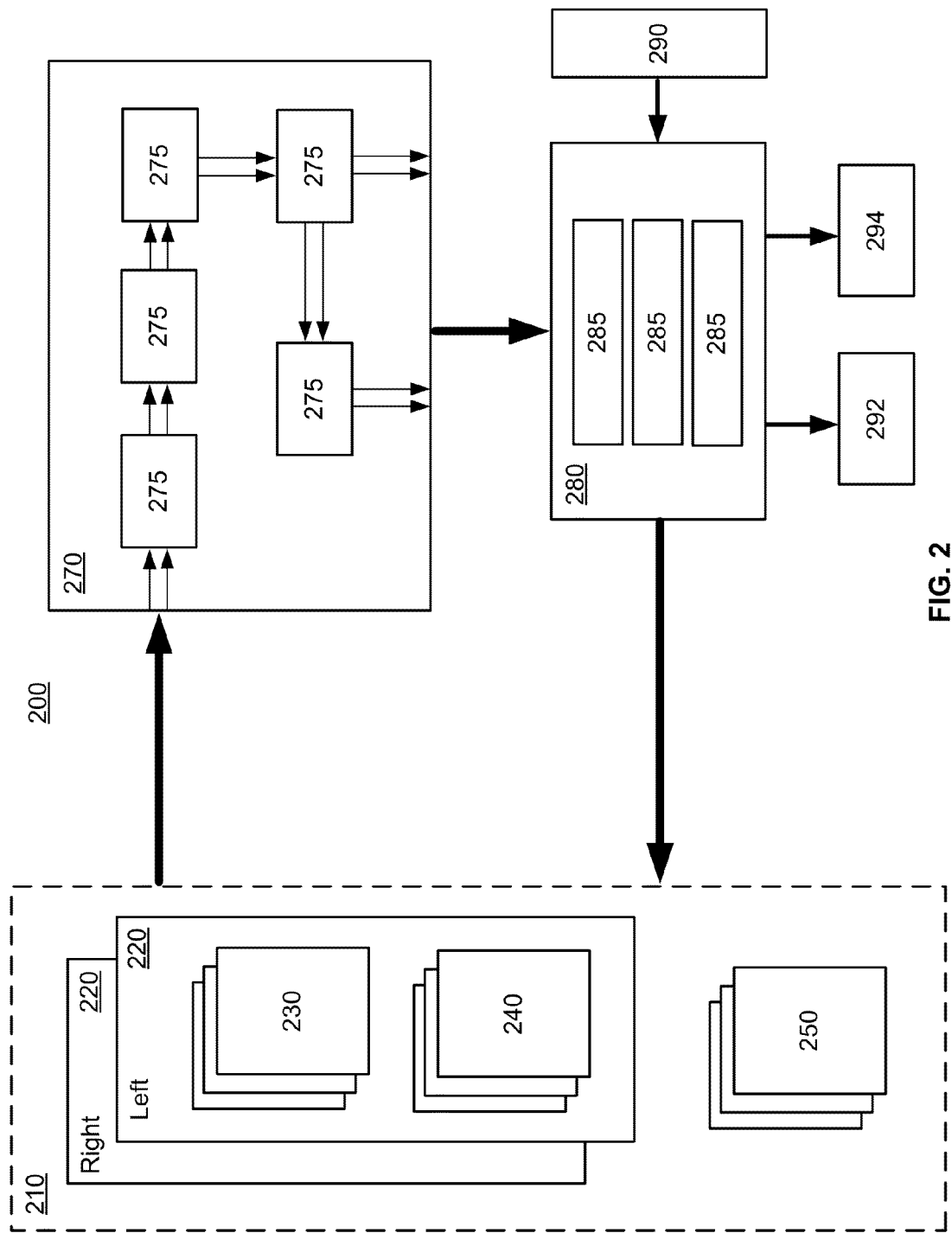

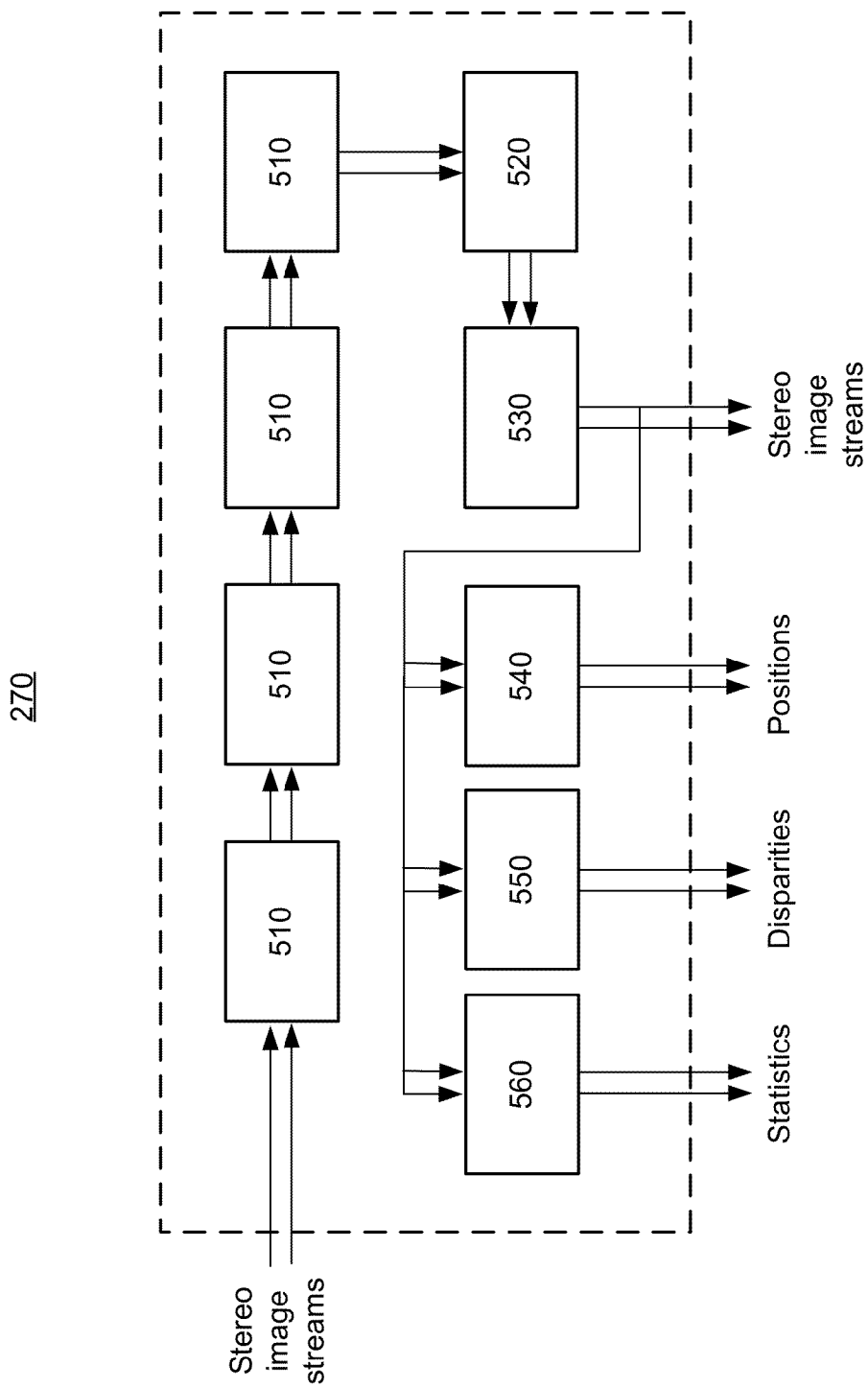

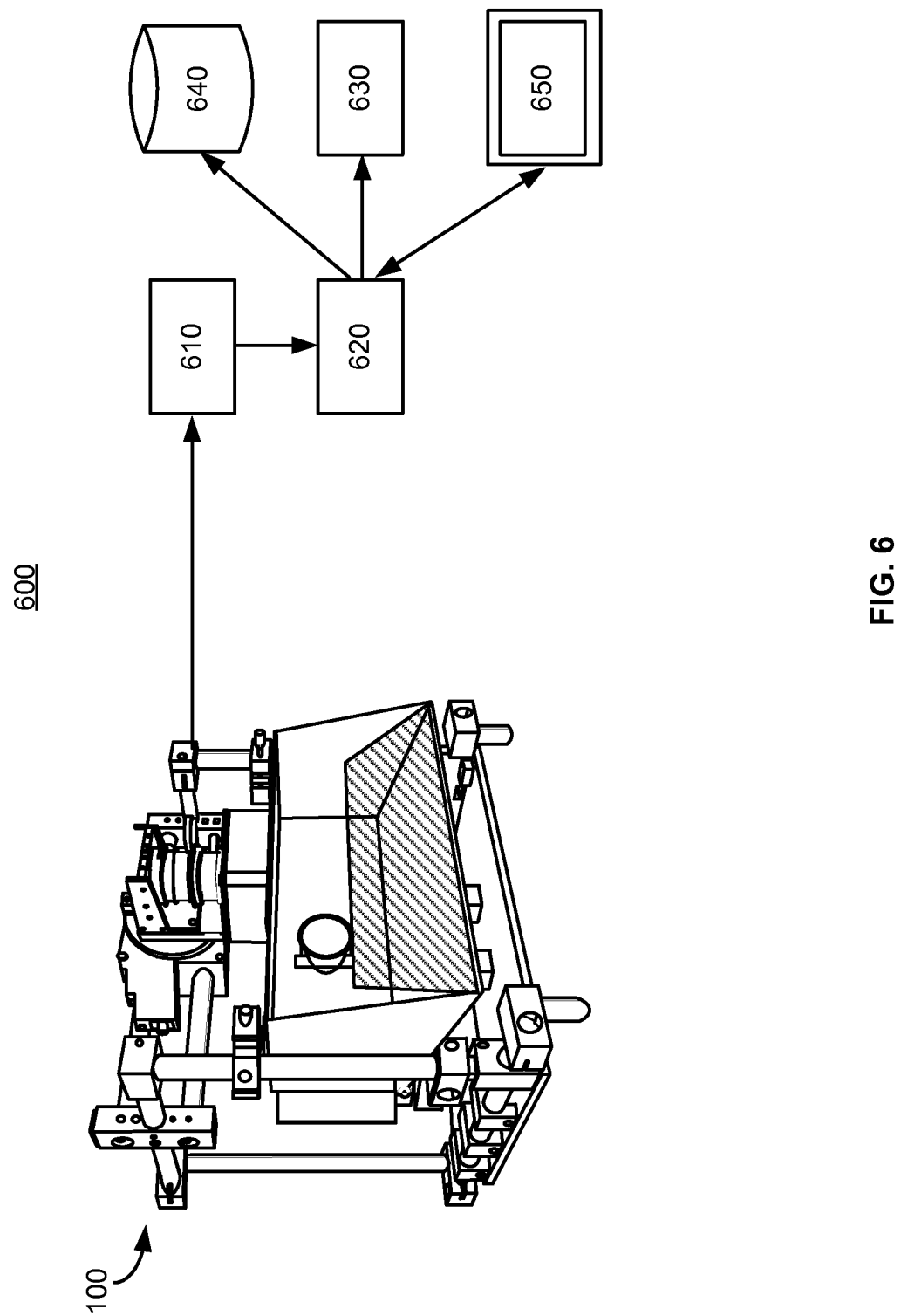

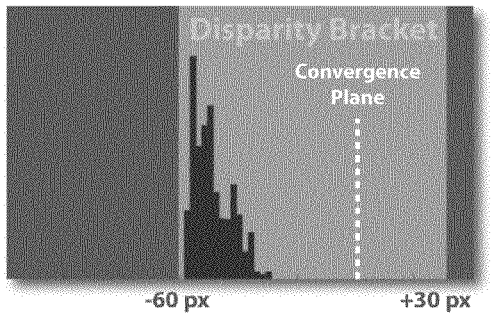
FIG. 7B

Interaxial distance: *125.2mm*    Convergence distance: *2.8m*
Depth Map
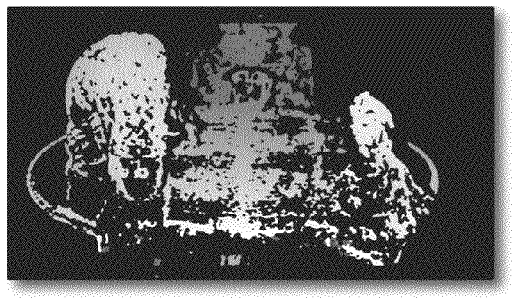
Depth Histogram
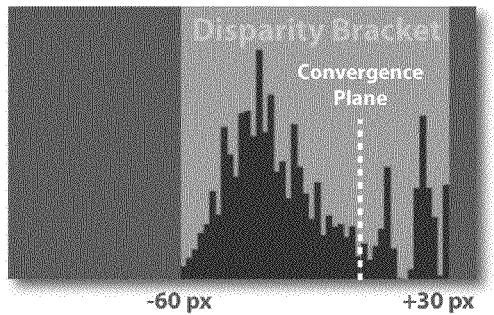
FIG. 7C

COMPUTATIONAL STEREOSCOPIC CAMERA SYSTEM

BACKGROUND

The present embodiments relate to image processing, in general, and in particular to processing of real-time stereoscopic vision images.

Stereoscopic 3D has gained significant importance in the entertainment industry today. However, production of high quality stereoscopic content is still a challenging art that requires mastering the complex interplay of human perception, 3D display properties, and artistic intent.

The entertainment industry is steadily moving towards stereoscopic 3D (S3D) movie production, and the number of movie titles released in S3D is continuously increasing. The production of stereoscopic movies, however, is more demanding than traditional movies, as S3D relies on a sensitive illusion created by projecting two different images to the viewer's eyes. It therefore requires proper attention to achieve a pleasant depth experience. Any imperfections, especially when accumulated over time, can cause wrong depth perception and adverse effects, such as eye strain, fatigue, or even motion sickness. The primary challenge of S3D is the complex interplay of human perception, 3D display properties, and content composition. The latter, in particular, represents the artistic objective of using depth as an element of storytelling, which often stands in contrast to problems that can arise due to inconsistent depth cues. From a production perspective, this presents a highly complex and non-trivial problem for content creation, which has to satisfy all of these technical, perceptual, and artistic objectives. Unfortunately, shooting high-quality, stereoscopic, live video content remains an art that has been mastered only by a small group of individuals. More specifically, the difficulty arises from the fact that in addition to setting traditional camera parameters (e.g., zoom, shutter speed, aperture, focus), S3D-related parameters, such as camera interaxial distance and convergence plane, have to be set correctly to create the intended depth effect. Adjusting all these parameters for complex, dynamically changing scenes poses additional challenges. Furthermore, scene cuts and shot framing have to be handled appropriately in order to provide a perceptually pleasing experience. These problems become even more pronounced for live broadcast of stereoscopic content, such as in sports applications. Capturing high-quality stereoscopic 3D footage therefore requires very sophisticated equipment along with the craftsmanship of an experienced stereographer all of which makes the S3D production inherently difficult and expensive.

BRIEF SUMMARY

A system and methods are provided to make stereoscopic 3D production as easy, intuitive, flexible, and reliable as possible. Captured signals are processed and analyzed in real-time using a stream analyzer. Stereoscopy and user settings define programmable control functionalities, which are executed in real-time using a control module. Computational power and flexibility is enabled by a dedicated software and hardware architecture. Shots that are traditionally difficult can be easily captured using the provided system.

In some embodiments, a stereo camera is provided, including at least two lenses, each arranged to focus light on a camera sensor in generating an image stream comprising light from more than one of the lenses. Logic is included for generating, based on the captured information, control signals for one or more parameters relating to stereo camera control or stereo image processing, wherein the one or more parameters affect what is captured on the camera sensor, and wherein the logic for generating generates the control signals such that they can be used to affect image capture during the same scene capture used to generate the control signals. A control element is included that responds to the one or more parameters to alter the two or more image streams while the two or more image streams are being captured.

A closed-loop control system for stereoscopic video capture is provided. At least two motorized lenses capture spatially-disparate images of a scene, wherein the at least two motorized lenses are positioned in accordance with specified parameters. At least two sensors generate image streams, wherein each sensor is coupled to a corresponding one of the at least two motorized lenses that focuses light on a corresponding one of the at least two sensors. One or more processors that are approximately adjacent to the at least two motorized lenses execute instructions to provide a stream analyzer and a control module. The stream analyzer receives the image streams from the sensors, wherein the stream analyzer is operable to analyze the image streams and the specified parameters in real-time, wherein the stream analyzer is operable to modify the image streams and generate metadata, and wherein the stream analyzer operates using the one or more processors. The control module then receives the image streams and metadata from the stream analyzer, wherein the control module is operable to analyze the image streams and the metadata and transmit updated parameters, and wherein the control module operates using the one or more processors. Finally, a control mechanism that is coupled to the at least two motorized lenses receives transmissions from the control module and modifies operation of the at least two motorized lenses in real-time in accordance with the updated parameters.

A method of capturing stereoscopic video is provided. Two or more image streams are captured, using two or more motorized cameras. The image streams are analyzed, using one or more processors, and metadata is generated. A user interface presents a display incorporating the metadata, wherein the user interface provides interaction metaphors for adjusting capture of the stereoscopic video. User input is received from the user interface. Control events are generated based on the user input, the image streams, and the metadata, wherein the control information comprises a plurality of events. Finally, the two or more motorized cameras are adjusted in real-time in response to the control events, wherein the adjusting modifies a camera convergence and an interaxial distance.

A method of providing a user interface for monitoring and controlling stereoscopic video capture is provided. Spatially-disparate image streams are received from at least two motorized cameras, wherein the at least two motorized cameras are positioned in accordance with specified parameters, and wherein a parameter comprises a conventional camera parameter or a stereoscopic camera parameter. A user interface is displayed on a touch screen, wherein the user interface displays the image streams and provides interaction metaphors that abstract underlying parameters. User input is received from the touch screen. Control events are generated, using one or more processors, in accordance with the user input, the image streams, and the metadata. Finally, operation of the at least two motorized cameras is adjusted in real-time in accordance with the control events.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the following drawings like reference numbers are used to refer to like elements. Although the following figures depict various example embodiments, the embodiments are not limited to the examples depicted in the figures.

FIG. 2 illustrates a block diagram of a camera-processing architecture.

FIG. 5 is a block diagram of a stream analyzer configuration.

FIG. 6 is a schematic of one embodiment of the camera rig.

FIGS. 7A-C include several examples of the effects of different interaxial and convergence settings.

DETAILED DESCRIPTION

A computational stereoscopic camera system and related methods are provided that feature a closed control loop from analysis to automatic adjustments of the physical camera and rig properties. A freely programmable architecture comprises a high-performance computational unit that analyzes the scene in real-time (e.g., by computing 3D structure or by tracking scene elements) and that implements knowledge from stereography to capture quality S3D video in control loop algorithms. Since stereography is still a widely open field with a continuously evolving conception of S3D and 3D cinematography, the camera architecture is designed as a freely reprogrammable set of processing units. This enables utilization of different algorithms for different scenes, shots, or artistic intentions. In addition, scripting of complex operations is supported in order to develop and optimize shots within the actual movie production. Thus, some of the post-production is shifted back into the production cycle. In a live broadcast scenario scripts may be predefined and executed on demand.

For efficient camera operation, interaction metaphors are devised that abstract the actual camera rig operations into intuitive gestures. The operator controls the camera using a multi-touch stereoscopic user interface that incorporates the interaction metaphors. In addition, the interface enables monitoring the S3D content as well as the related stereoscopic parameters instantly. In order to achieve real-time performance, a custom computational architecture combines FPGA, GPU and CPU processing close to the sensor to achieve a low latency feedback loop. Using this system, even extremely difficult shots can be scripted and captured with ease.

The main driving goal behind the design is to make S3D production for artists as intuitive and flexible as possible. In principle, the system can be combined with any motorized stereoscopic camera rig. The architecture further comprises a configurable stream analyzer that efficiently performs video processing and analysis operations, a programmable control module that implements control functionalities derived e.g., from best-practice rules of stereography or user input, and a user interface and display for intuitive interaction. Real-time performance and computational flexibility are enabled by the combination of FPGA, GPU, and CPU processing. Only such a design enables real-time closed loop control of physical camera parameters. The core of the control loop is a disparity-based implementation of knowledge from stereography combined with user settings, e.g., to allow for artistic depth composition of a scene. Intuitive interaction is enabled through metaphors via a touch screen with stereoscopic visualization. It allows monitoring and controlling all basic characteristics of the signals and functionalities of the system. Programmable control provides event scripting, e.g., for complex shots or for user preferences.

Figure 1A:
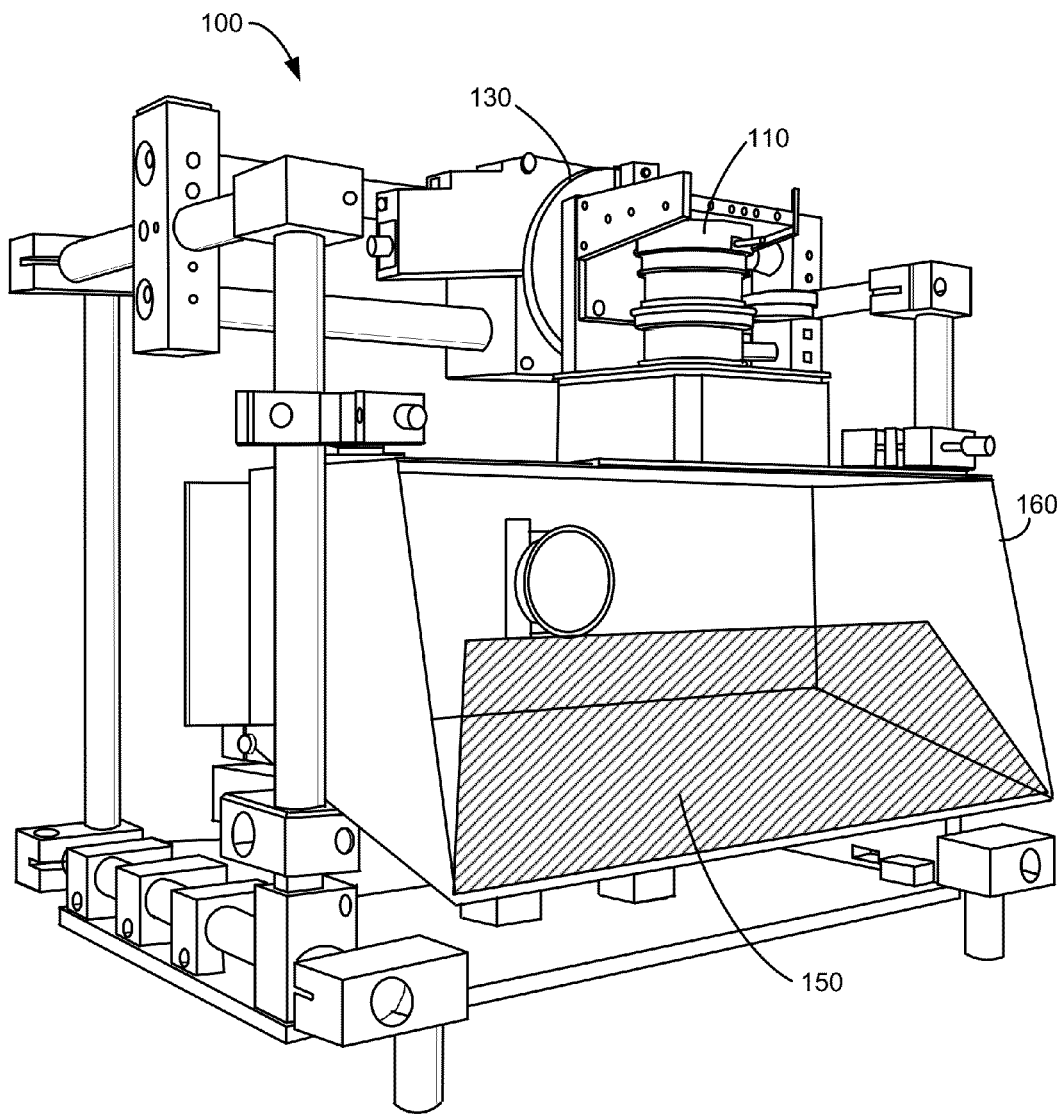
FIGS. 1A-B illustrate an example configuration of a stereoscopic camera system.
Figure 1B:
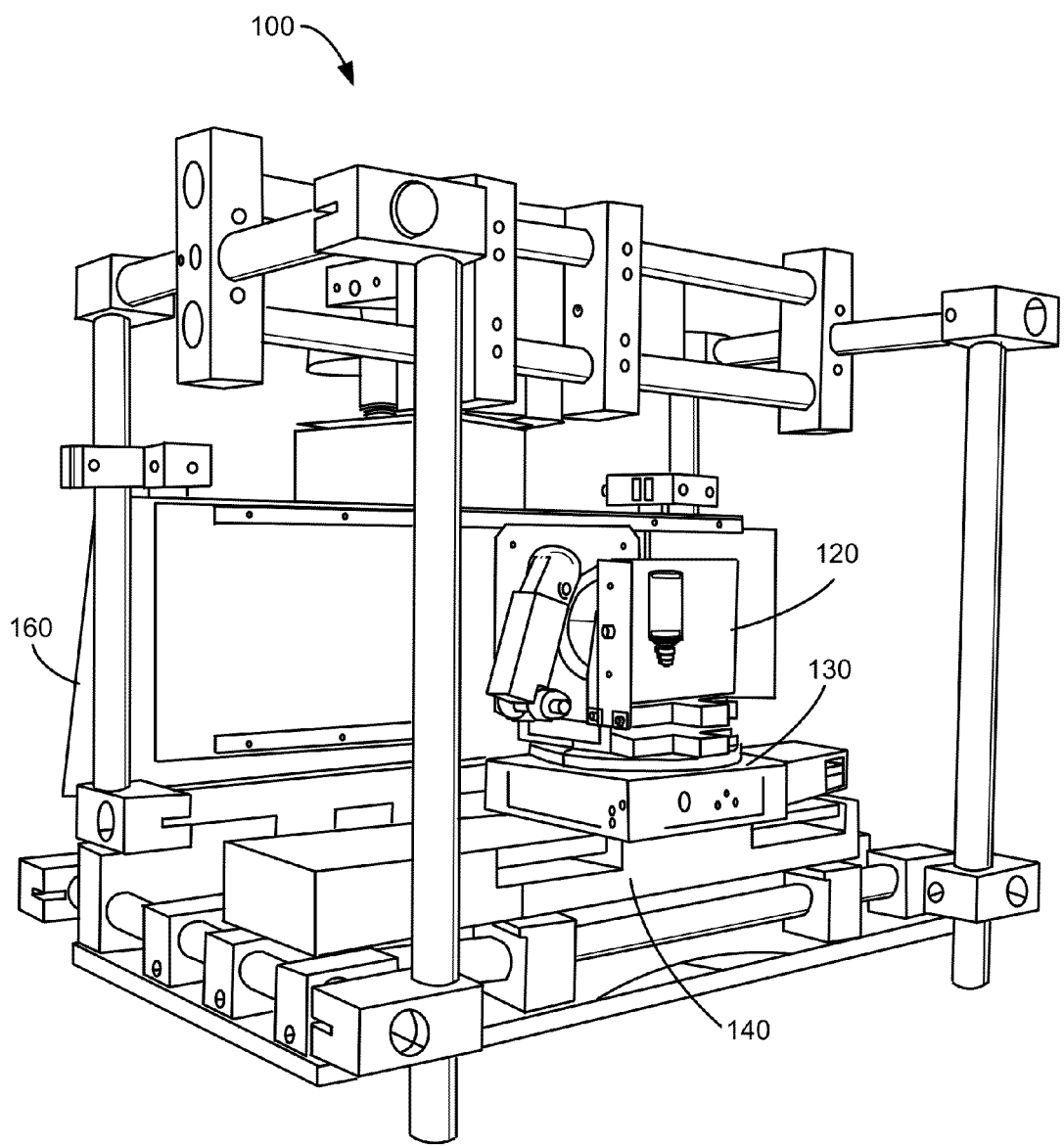

FIGS. 1A-B illustrate an example configuration of a stereoscopic camera system 100. FIG. 1A illustrates a view of stereoscopic camera system 100 from in front of the cameras, whereas FIG. 1B illustrates a view of stereoscopic camera system 100 from behind the cameras. The system 100 uses two cameras 110 and 120, each camera having a lens attached to it. Each camera and lens is motorized—operational aspects such as aperture, focus, zoom, shutter speed, exposure, frame rate, and region of interest can be controlled electronically. Each of cameras 110 and 120 are attached to a motorized rotational stage 130. Camera 120 is additionally mounted on a motorized linear stage 140. For the current prototype, a half mirror (beam-splitter) 150 is employed instead of arranging the cameras physically side-by-side. So the cameras appear to be side by side, but are actually not. The benefit of this configuration is that the cameras 110 and 120 can be moved arbitrarily close together. The motorized rotational stages 130 are used to control the convergence of cameras 110 and 120, i.e., where they are looking towards. The motorized linear stage 140 is used to control the distance between cameras 110 and 120, the so-called inter-axial distance. The matte box 160 is used to block of unwanted light coming from the sides/bottom/top.

One embodiment of a stereoscopic camera system implements all basic functionalities of the concept, thereby enabling a number of compelling applications, including automatic disparity range adjustment via interaxial distance and convergence, touch-based refocusing and convergence, follow focus and convergence tracking, etc. Such results may be impossible or difficult to achieve with current systems. As one of skill in the relevant field of art would recognize, the basic paradigm of the design, being an efficient computational vision system incorporating advanced image analysis and high level concepts into a real-time closed control loop, easily extends to other application scenarios as well, such as detecting and resolving framing violations, non-linear disparity mapping, detecting and resolving zoom differences, automatic floating window insertions, etc.

Architecture Overview

FIG. 2 illustrates one embodiment of the architecture comprises a motorized stereoscopic camera system 200 that is accompanied by a powerful processing architecture. The processing architecture is conceptually divided into stream processing and control processing. The stream analyzer receives the video streams from the cameras and performs the image processing and analysis for each frame. The control module analyzes these results and evaluates control algorithms to re-adjust the camera parameters and to control the feedback loop. To account for artistic control or changing requirements, both processors can be reprogrammed easily.

Motorized Camera Set-Up.

In one embodiment, stereo rig configuration 210 includes at least one or more cameras and a control mechanism. In one embodiment, the system is designed for two cameras aligned along a common baseline. Each camera may include one or more image sensors and one or more lenses. Elements of stereo rig configuration 210 may include conventional camera parameters and stereoscopic camera parameters. Conventional camera parameters 220 may include parameters 230 used to configure operation of the image sensors (e.g., exposure time) and parameters 240 used to configure operation of the lenses (e.g., aperture, focus, zoom). Such conventional camera parameters may be configured independently for each camera. Stereoscopic camera parameters 250 may be used to adjust stereoscopic aspects of the configuration of the cameras (e.g., camera convergence, interaxial distance between the cameras). In one embodiment, the control mechanism includes motorized elements of the stereo rig and/or cameras that control operation and configuration of the cameras in accordance with the parameters; different elements of the stereo rig and/or cameras may be independently motorized. Changes to the parameters may be issued by the control module to the control mechanism in a precisely timed manner. Motorization of any aspect of the system may be accomplished using any conventional technology used in the art, e.g., electrical motors, actuation mechanisms, hydraulic mechanisms, etc.

Stream Analyzer.

Stream analyzer 270 receives the stereoscopic video and processes it to generate additional streams of metadata. More specifically, the video streams are distributed to a collection of virtual processing units 275, a.k.a. plug-ins, that can be connected and configured arbitrarily. Dynamic reconfiguration is achieved by providing a modular plug-in architecture: all units share a common interface and any output stream can be connected to any input stream provided that the respective formats match. Furthermore, new virtual units can be easily created and added to extend the system. One example of a stream analyzer configuration may contain Bayer-demosaicing, color correction, disparity calculations, image rectification, image warping, feature matching, optical flow, alignment estimation, homography estimation, color correction estimation, and non-linear disparity mapping.

Control Module for Real-Time Camera Control.

Control module 280 takes in video and metadata from stream analyzer 270, analyzes the video and metadata using control algorithms 285, and then issues new events to the control mechanism, which operates the respective camera motors and the stream-processing configuration. Users can tune and extend control module 280 or write a completely different controller to fit particular applications. In one embodiment, control module 280 may also be used to dynamically reconfigure stream analyzer 270.

User Interface and Display.

A stereoscopic multi-touch interface 290 may be provided that allows for toggling between both stereoscopic views and monoscopic previews. The multi-touch interface allows for controlling the camera parameters and control algorithms using simple, intuitive interaction metaphors. In one embodiment, stereoscopic camera system 200 may include a display 292 to preview video and monitor operations and/or storage 294 to store captured and processed video and/or metadata. In one embodiment, display 292 is combined with stereoscopic multi-touch interface 290.

System Performance.

Dual, high-resolution video streams at movie frame rates demand high data bandwidth as well as computational power. To process the video streams in real-time, the architecture is implemented on a high-performance heterogeneous system comprising high-density FPGAs, GPUs, and/or CPUs amongst which different tasks are distributed. High-level control algorithms may be mainly computed on the CPU, while stream processing tasks may be carried out on FPGA and/or GPU. In addition, the interconnections between cameras and computational system are ideally designed for low-latency feedback.

Real-Time Camera Control

Satisfying the S3D comfort zone constraints in addition to setting traditional camera parameters may require burdensome manual tuning by the rig operator. To alleviate the currently cumbersome S3D acquisition process, a user interface ("UI") system is provided that relieves the operator from manually setting all parameters. The UI system provides a real-time automated controller capable of setting all or a subset of the camera parameters for each scene. Closing the loop between the camera output and the camera settings enables more automation and considerably simplifies the movie production process—thereby minimizing the effort expended on time-consuming on-set adjustments and post-processing steps. Moreover, shots that are difficult to capture with traditional rigs can be handled much more easily. For instance, dynamic scenes that require simultaneous focus and zoom adjustments, typically very hard to achieve with a system without the feedback loop, can be captured using this system.

FIG. 2 illustrates the control loop: the stream analyzer extracts information from the scene and the control module deduces appropriate action from the gathered information and feeds it back to the camera system. The control variables are the stereoscopic settings (interaxial distance and convergence plane) and the traditional camera settings. The feedback variables include for example, screen disparities or object positions. Since most of the stereoscopic limitations can be deduced from disparity values, some examples herein disclose disparity based control. However, as one of skill in the art would be aware, other control structures can be implemented—some of those are discussed infra.

Camera Parameters and Screen Disparities

The screen disparity of a given point in the scene refers to the distance between the two corresponding points in the frames recorded by the left and the right camera. The disparity is often the most important parameter for S3D depth perception and it is related to most comfort-zone constraints—therefore, it may be considered as the central parameter in the control loop. Embodiments described below show how to compute screen disparities with camera configuration parameters and scene depth information.

Figure 3:
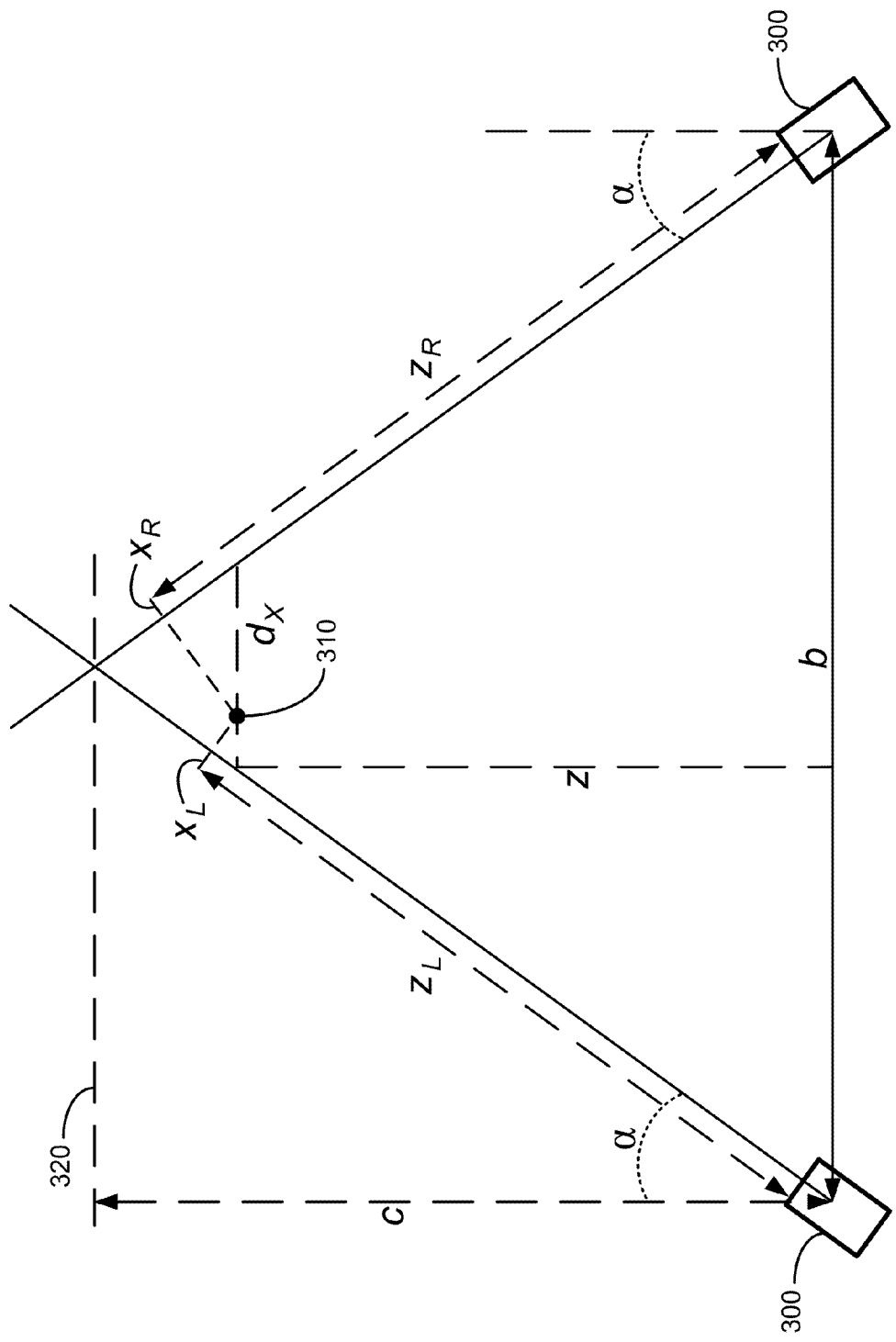
FIG. 3 is a graph displaying a computation of screen space disparities.

FIG. 3 is a graph displaying a computation of screen space disparities. The formulation of screen disparities assumes rectified and radially undistorted images as input. More specifically, it is assumed that both cameras 300 have the same intrinsic parameters, while their principal axes are coplanar and form the same angle with the baseline. For a focal length f of the cameras, the screen disparity d of an object 310 can be described as shown in Equation 1 below:

$$d = -f\left(\frac{x_L}{z_L} - \frac{x_R}{z_R}\right) \quad (1)$$

where $z_L$, $z_R$ are the depths of the object 310 in left and right camera coordinates, and $x_L$, $x_R$ are the signed distances from the two principal axes to the object 310. For small convergence rotation angles α, the depths of the object 310 can be approximated as $z_L \approx z_R \approx z$, where z is the distance from the object 310 to the baseline. With the approximation $x_L - x_R \approx d_x$, the screen disparity can be expressed as shown in Equation 2 below:

$$d \approx -f\frac{d_x}{z} = -f\left(\frac{b}{z} - 2\tan\alpha\right) = -f\left(\frac{b}{z} - \frac{b}{c}\right) \quad (2)$$

where b denotes the interaxial distance, $\alpha$ the convergence rotation angle, and c the convergence depth (i.e., the distance from convergence plane 320 to the camera baseline), as calculated in Equation 3 below $$c = \frac{b}{2\tan\alpha} \quad (3)$$

in which all objects yield a disparity of zero pixels. Given the current camera parameters and the screen disparity d, the depth z of an object can be computed as in Equation 4:

$$z = \frac{bf}{-d + 2f\tan\alpha} = \frac{bf}{-d + f\frac{b}{c}}. \quad (4)$$

Disparity-Based Camera Control

In order to control the parameters of the camera system to shoot visually pleasing 3D videos, disparities d for a given camera setting f, b, and $\alpha$ are related to the new disparities d' obtained with a modified setting f', b', and $\alpha'$ as shown in Equation 5 below:

$$d' = -f'\left(\frac{b'(-d + f\frac{b}{c})}{bf} - \frac{b'}{c'}\right) \quad (5)$$

Using the convergence depth c as a more intuitive parameter instead of $\alpha$, the following adjustment strategies follow directly from Equation 5.

Adjusting Interaxial Distance.

In one embodiment, the comfort zone constraints are maintained while keeping the convergence plane. To this end, only the interaxial distance b is adjusted to compress or spread out the distribution of the disparities (see FIGS. 7A-C). More specifically, the maximum interaxial distance b' (given fixed focal length f and convergence depth c) is determined for which the screen space disparities do not exceed user defined comfort zone limits $[d'_{min}, d'_{max}]$. If the current screen disparities lie in the range of $[d_{min}, d_{max}]$, the maximum allowed interaxial distance b' can be computed as in Equation 6:

$$b' = \max\left(\min\left(\frac{d'_{min}}{d_{min}}, \frac{d'_{max}}{d_{max}}\right)b, 0\right) \quad (6)$$

Adjusting interaxial distance and convergence plane. To fully utilize the target disparity range $[d'_{min}, d'_{max}]$ for a current disparity range $[d_{min}, d_{max}]$, both the interaxial distance b' and the convergence depth c' need to be adjusted according to $$b' = \frac{(d'_{max} - d'_{min})}{d_{max} - d_{min}}b \quad (7)$$

$$c' = \frac{(d'_{max} - d'_{min})bcf}{(d'_{min}d_{max} - d'_{max}d_{min})c + (d'_{max} - d'_{min})bf}. \quad (8)$$

Time-Varying Changes and Control

Some embodiments of the controller adapt interaxial distance and convergence for time-varying scenes.

Median and Low-Pass Filtering.

Equations 7 and 8 can be used to directly control the interaxial distance and convergence plane. However, the controllers then immediately react to changes in disparities, which makes them highly sensitive to errors in the disparity estimation. Moreover, to get smooth transitions, it may be desirable to slow down the controller reaction. Use of two filters avoids sudden changes and enables tuning of the controllers: first, a temporal median filter removes outliers in the controller output; then, a low-pass filter removes the (remaining) high-frequency components. A high median filter value makes the controller more robust against erroneous jumps in the disparities, but also increases the latency. The cut-off frequency of the low-pass filter determines the response time of the controller: a low cut-off frequency results in a very inert system, whereas a high value results in a very responsive system.

Alternative Controllers and Filters.

Embodiments base on classical feedback controllers, such as proportional integral-derivative (PID) controllers, may have no actual knowledge of the relation between feedback value and control signal. Although very robust against noise and model inaccuracies, such controllers may lack the ability to react quickly, especially when the sampling rate is limited to the frame rate. In applications where the controller should anticipate the scene depth variations, a prediction filter can be plugged-in, such as extended Kalman filters or particle filters. A classical Kalman filter may not be suitable because the disparity noise is not necessarily Gaussian distributed (sporadic high outliers) and the model equations are non-linear.

Programmable Control.

Stereoscopic content creation has no unique solution on how to set the stereoscopic settings because of varying scenes, applications, and user preferences. Moreover, for certain applications, it is useful to couple the stereoscopic parameters to the lens and camera settings. Thus, the actual control behavior may vary with the application. To combine flexibility with ease of use, a programmable control framework is provided that allows for defining arbitrary control functions. A look-up table or a function may be used to relate control parameters. In particular, filter parameters could be defined versus time or as a function of disparities or disparity velocities. Also, instead of fixed disparity range requirements, embodiments may incorporate a function of user requirements and current scene information (e.g., depth histogram).

Beyond Interaxial and Convergence Control

Some embodiments may include extensions to the disparity based automatic interaxial distance and convergence plane controllers.

Depth-of-Field.

A different approach for handling disparities outside the comfort zone is to blur the image in the regions that have too large disparities. The blurring is obtained by narrowing the depth-of-field and focusing on the object or region within the comfort zone. In some embodiments, the controller sets aperture and integration time to get the required depth-of-field, and then sets interaxial distance and convergence plane accordingly. The targeted disparity range could be defined as a function of depth-of-field in a programmable controller, for instance.

Frame Violations.

Frame violations occur when an object with negative disparity (in front of the screen) intersects with the left or right image boundary. The so-called framing effect causes unpleasant stereoscopy, because of the conflicting depth cues. In some embodiments, framing is detected when a large patch with negative disparities is present at the left or right image boundaries; framing compensation can thereby be applied in real-time which is of particular importance in live broadcasting applications. One available technique for addressing frame violations removes one of the two views in the vicinity of the left and right image boundaries (e.g., floating window technique).

Viewer-Centric Approaches.

Viewer-centric approaches for stereoscopy usually consider more variables in addition to the disparities captured and camera parameters used during filming. While screen size, distance to the viewer, and the human inter-ocular distance greatly affect the possible comfort zone, all related control parameters directly result from the measured disparities and camera parameters. Some embodiments may take viewer-centric variables into account as well.

Interactive Control

While the control algorithms presented in the previous section can be used to limit the disparity range automatically, the user often wants to be kept in the loop to account for artistic control. In addition to letting the user 'turn knobs', a control metaphor is provided that is based on direct selection: using a multi-touch interface, the user can select points on the screen to set various parameters directly tied to scene content.

This selection metaphor then allows for intuitive parameter changes by selecting the objects of interest. Some embodiments implement several interactive controls using this scheme: refocusing, re-convergence based on touch, object tracking for follow focus and convergence, and intuitive depth-of-field selection.

Interactive Control Applications

Touch-Based Refocusing and Convergence.

Instead of calculating distances, the user can set the focus and convergence plane onto a selected object. The point of interest may be selected by performing window-based matching in a region around the selected point. The window matching then returns the best reliable disparity patch, which is used to calculate the depth of the object. With the depth of the object, the respective convergence plane and focus distance according to Equation 4 can be evaluated.

Tracking.

Follow-focus and follow-convergence are traditionally complex control mechanisms that usually require highly trained operators to be performed well. In addition to touch-based refocusing/convergence, some embodiments may incorporate a template tracker into the framework. Using the same strategy to calculate the disparities as mentioned in the previous paragraph, the embodiments can perform follow-focus and/or follow-convergence of a tracked object—an automatic operation that would not be possible without the computational feedback loop.

User Interface

Figure 4A:
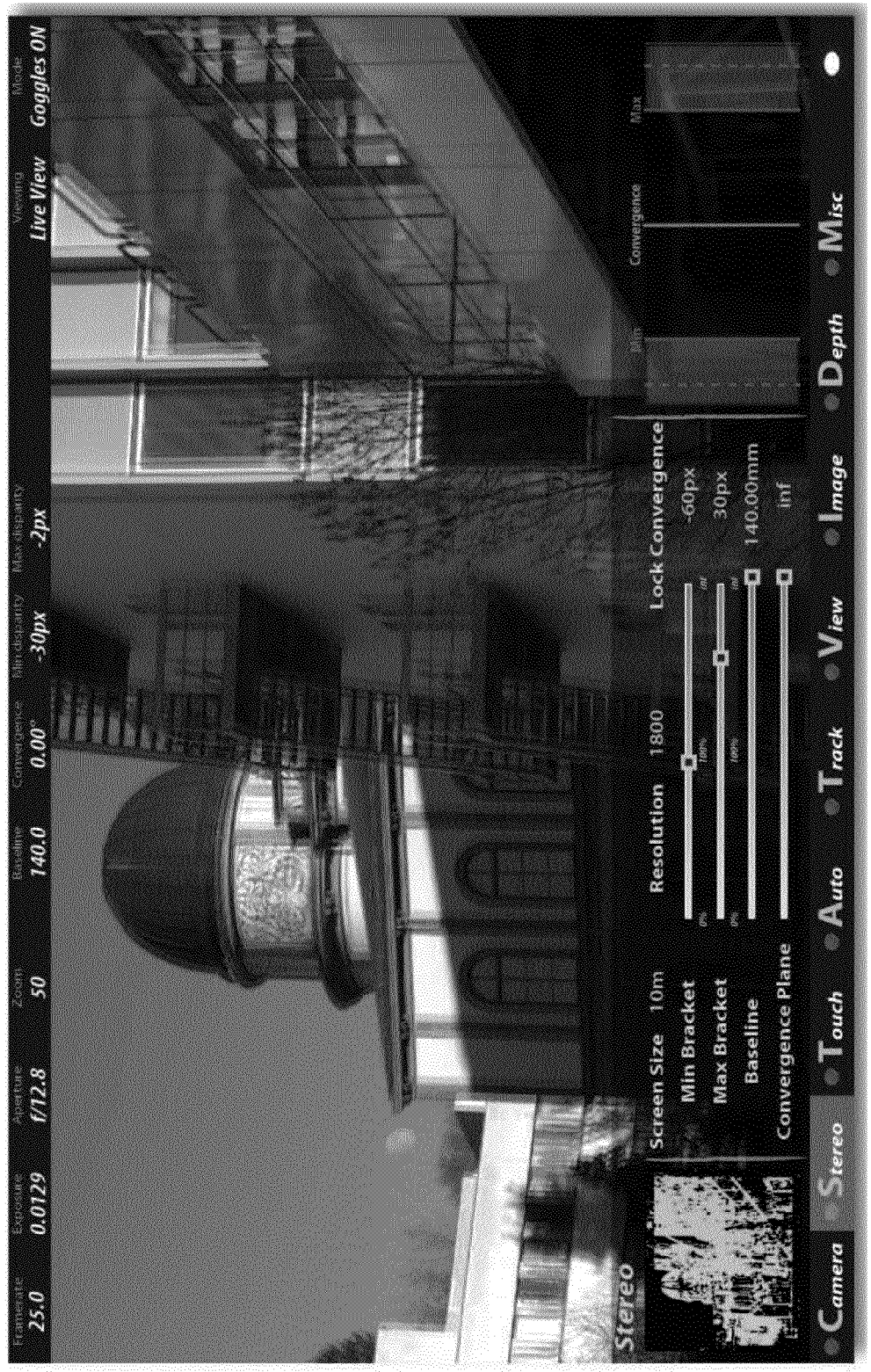
FIGS. 4A-C illustrate examples of a multi-touch user interface.

FIG. 4A illustrates one embodiment of a multi-touch user interface (UI). Some embodiments provide a multi-touch user interface (UI) that displays the real-time video stream in different viewing modes (red-cyan, disparity map, and shutter-glass S3D), as well as associated scene information and camera parameters. Multiple menus allow for quickly setting parameters or to enter different operation modes. Some embodiments provide the following gesture functions to enhance user-computer interaction: traditional clicks, virtual sliders, and click-modes. Users can perform standard interface operations with one-finger clicks to toggle control buttons, open or close sub-menus and drag slider thumbs.

Figure 4B:
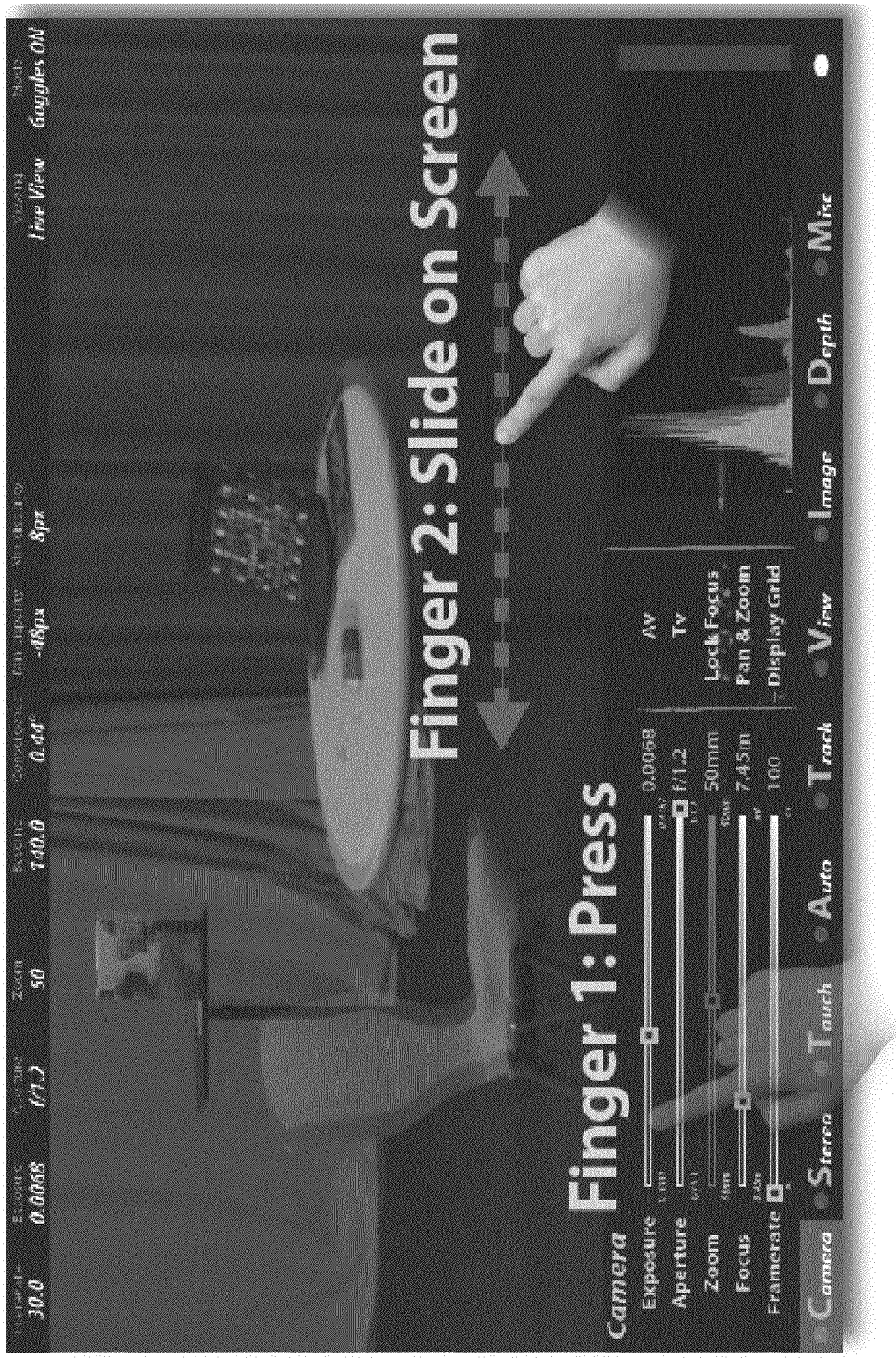

FIG. 4B illustrates an embodiment that provides multi-touch UI functionality using a virtual slider. Slider control can be tedious and inaccurate when using multi-touch displays, unless huge sliders are used. To support efficient control of smaller sliders more accurately, some embodiments provide virtual sliders. Users can click on a slider with one finger, and subsequently use the whole screen space as invisible slider bar using a second finger. The user interface scales the finger movement and transfers it to relative shifts of the slider thumb. In this way users can operate in a larger and more comfortable space to control the slider value in a much finer scale.

Figure 4C:

FIG. 4C illustrates an embodiment that provides multi-touch UI functionality in an alternate button mode. This mode, i.e., a click-combination gesture, resembles the function of a Shift key or Control key or Alt key on a normal keyboard. While keeping the first finger pressed on an alternate button, the second finger can be used to select screen objects, e.g., to compute the convergence plane, or click buttons, links, or other keys. In some embodiments, when the alternate button is pressed, the user interface will present different buttons, links, or other functionality. Furthermore, the second finger can be used to perform consecutive actions as long as the first finger rests on the modifier button.

Programmable Control Implementation

Stereoscopic video production often employs a wide variety of different styles depending on the specific artistic intent. While some control algorithms, such as maintaining the comfort zone, play an important role in any S3D production, artistic control algorithms might change depending on the current shot. To accommodate this need for extensibility, some embodiments provide a programmable-control architecture that allows implementing new control loop algorithms in addition to any algorithms provided by default.

Conceptually, the control algorithms are decoupled from stream processing: while the control module is able to close the loop by reconfiguring the cameras, the stream analyzer is responsible for generating the data needed to compute the control results. Furthermore, the control module may issue events to the cameras and to a control mechanism.

In one embodiment, the control module may also receive user input (e.g., from a multi-touchscreen user interface)—the user input may also include programmable look-up tables or functions. In one embodiment, a control algorithm of the control module provides a temporal median filter to reduce random jumps in disparities from estimation errors. In one embodiment, a control algorithm of the control module provides low-pass filter stage with variable cut-off frequency to enable tuning stereoscopic parameters, such as the interaxial distance and camera convergence, in a manner that is very inert to very responsive.

Stream Analyzer

The disclosed concept of stream processing is based on modular setups traditionally used in professional audio/video production studios, where specialized devices are mounted on a rack and interconnected to create flexible processing pipelines.

Analogously, one embodiment of the stream analyzer assembles available stream plug-ins to form a virtual device rack. The plug-ins are based on a simple interface to interchange video frame data and each plug-in is able to perform a specific processing step. Then, multiple plug-ins can be connected at run-time to form different types of processing pipelines. In order to facilitate these tasks, each plug-in defines its own set of input and output connectors and accepted formats, depending on its purpose. These connectors are associated with an image buffer which is annotated with dimensions and format. Furthermore, each plug-in is able to report its description and its list of functions (e.g., by invoking a run-time help( ) function). Any reported function can be called using the runCommand(" . . . ") function, without knowing the exact signatures at compile-time. Plug-in parameters can be set and retrieved using similar commands.

A central stream manager creates, configures, and executes the processing pipelines; it represents the virtual device rack and manages the assembly of virtual devices. The stream manager searches predefined locations for available plug-ins, creates a plug-in catalog and a list of associated methods for each plug-in. Based on the available plug-in catalog, a user program can define a desired pipeline by instantiating plug-ins and by specifying their interconnections. The central stream manager then "compiles" the pipeline: in a first step a directed graph of all connected plug-ins is constructed to derive a processing order. Furthermore, illegal connections are detected and reported, e.g., multiple sources connected to one single input connector, or cyclic dependencies. In the next step, buffer formats for all interface connections are propagated to ensure that all data formats are correct.

At run-time, the stream manager issues processing requests in the correct order and manages data movement between individual plug-ins. This is especially important when using device dependent languages such as OpenCL or CUDA, in order to avoid unnecessary transfers.

Using this concept, a basic application does not depend on the available plug-ins and it can be easily reconfigured during run-time to accommodate a specific scene being shot. Furthermore, this programming model facilitates an easy creation of arbitrary pipelines. More importantly, third-party developers can adhere to this simple interface and provide additional plug-ins to extend the functionality of the current camera system.

Control Module

Conceptually, the stream analyzer employs a unidirectional data flow model—it is only allowed to process the incoming stream. However, the control module is more general. It is able to reconfigure all camera settings as well as the stream analyzer. The stream analyzer may be decoupled from the control module in order to ensure that the data flow is not interrupted and to prevent that the stream analyzer interferes with itself.

The control units adhere to a simple interface that is very similar to the interface of the stream processing plug-ins. Control units can request buffer handles and parameter settings from the stream manager. Based on the available buffer information, a control unit evaluates its algorithms and it can decide how to reconfigure the stream processing and the camera. The stream reconfiguration is directly performed using the stream manager. Camera reconfiguration is performed using events sent to an event queue. These events are described in the next section. One embodiment of the control module allows for multiple processing plug-ins to operate in parallel. However, the system has to ensure that no conflicting configuration requests are generated. In order to resolve this, events are attributed with a priority to resolve such conflicts.

Event Scripting

The control module issues events to set camera, lens, and stereoscopic parameters in a precise and scriptable way. All events can be set either to a point relative to the current clock or relative to a future exposure starting time. In addition to the start time stamp, the control program can also prescribe a certain duration for the event, for example, in order to increase the interaxial very slowly. An example timed event that controls the camera aperture can be written as follows:

Aperture Event *ae=new ApertureEvent( )
    ae→setAperture(1.4); // set aperture to f/1.4
    ae→setStartTime(0.03); // start in 0.03 s
    ae→setDuration(0); // as fast as possible
    EventQueue::addEvent(ae);

The absolute-timed events can be helpful for immediate actions or to execute a pre-scripted sequence of commands. Alternatively, events can be timed relatively to an exposure event. Such events are useful, for example, to keep the cameras still during the exposure time and to change the parameters only during the read-out phase, if the physical changes are fast enough.

After a new event has been configured it is entered into the event queue. The event queue manages the timing and delegation of events to the appropriate hardware controllers, prohibiting a direct control by the control programs. In this way the event queue resolves conflicts according to the assigned priorities. If the priority of a new event is smaller or equal to the priority of the currently executing event, the prior event will be canceled and replaced by the new one. Event settings may be supported for focus, aperture, interaxial distance, convergence, zoom, exposure, and frame rate. However, other events can be implemented as well if the appropriate hardware controllers are present and events have been programmed for them. Note that this concept is targeted for streaming video. Using events, camera settings for whole scenes can be pre-scripted and executed on demand.

Configuration Example

FIG. 5 illustrates an example configuration of plug-ins for the stream analyzer. In stream analyzer 270, various low-level image-manipulation algorithms 510 are performed by different plug-ins, e.g., fixed pattern noise reduction, pixel response correction, Bayer demosaicing, linear and non-linear color correction. After basic color processing, additional plug-ins operate on the image streams to achieve radial undistortion 520 and eliminate vertical disparities 530; this latter plug-in may output the corrected stereo video. Furthermore, a plug-in 540 performs pattern tracking and template matching to estimate local screen disparities and perform object tracking; this plug-in may output object positions. Another plug-in 550 estimates stereoscopic disparities, which are necessary for the control algorithms. A last plug-in 560 may generate statistics related to the image streams. Finally, the control module 280 analyzes the information computed by the stream analyzer 270, evaluates the control algorithms, and reconfigures the cameras on the fly.

Implementation

The proposed computational system is heterogeneous. It is implemented using high-density field programmable gate arrays (FPGAs), a state-of-the-art GPU, and a quad-core CPU. The stream processing plug-ins are distributed among different hardware units; the control algorithms mostly run on the CPU. This section presents details on the lower and higher level stream processing plug-ins, the implementation of the system as well as the specific hardware architecture.

Low-Level Stream Processing Plug-Ins

Image Pre-Processing.

Low-level processing mainly encompasses the pre-processing steps from traditional image processing. The synchronization of the two cameras is handled by simultaneously releasing a trigger pulse from the FPGA to both camera sensors with a configurable frame rate. In an embodiment where the employed camera does not correct for fixed pattern noise (FPN) and pixel response non-uniformity (PRNU), the disclosed framework enables capture of so-called black images for different exposure times and white images for the PRNU correction. The correction is then performed in a single plug-in on the FPGA. One embodiment uses a linear algorithm to extract the color image from the color filter array image. More specifically, the embodiment may use a linear 5×5 interpolation filter that is based on the Wiener filter. Next, the RGB values captured by the camera sensor need to be transformed to a well-defined colorimetric space such as sRGB. In order to accomplish this step, a linear transformation 3×3 matrix is estimated using a color checker chart. In addition, white balancing is performed in the same step. The color correction plug-in that executes on the FPGA applies this matrix transformation to the RGB values. A gain correction plug-in can be added to enhance contrast.

Stereoscopic Matching.

In addition to transforming the colors of the two cameras separately into calibrated color spaces, non-linear color shifts between the two cameras must be taken into account. Color matching is particularly important in mirror-rigs due to the dispersive behavior of the beam-splitter mirrors. Some embodiments include programmable look-up tables (LUTs) on the FPGA that can realize arbitrary non-linear transformations on the individual color components in the RGB space or in the HSV space. One example for determining the LUTs is to separately equalize the histograms of the HSV channels of the two images. Radial and tangential distortion correction may be performed on the GPU according to the Brown calibration model [Brown 1966]. Next, to rectify the images, a projective transformation is applied to both video streams on the GPU.

Disparity Estimation Plug-In

The disclosed control algorithms rely heavily on robust disparity information of the captured scene. In order to achieve real-time performance using the disclosed architecture, one embodiment employs a local window method. First, the incoming images are progressively downscaled into an image pyramid. Then, starting on the lowest resolution, the algorithm returns the best match for each pixel in the first image along a line in the second image. The resulting disparity of the best match is propagated to the next higher resolution where it serves as offset to refine the match. For the matching kernel, an embodiment may use the normalized cross correlation (NCC) in order to account for possible changes in offset and gain of the pixel intensities.

Local window-based methods offer the best degree of parallelization and only require modest computational resources compared to more advanced disparity matching. However, these methods typically overextend object boundaries when using large matching windows or low resolution images. Conversely, reducing the matching radius or the amount of downscaling increases the amount of disparity estimation errors. For the disclosed automatic control architecture, dense per-pixel disparity values are not needed, but rather a robust histogram distribution of the disparities of a scene. Hence, embodiments optimize the disparity estimation to yield minimal amount of outliers: the lowest resolution image in the pyramid architecture is downscaled 4 to 5 times, and matching is performed using large kernel sizes (15 to 20 pixels). The disparity matching is performed from left-to-right and right-to-left, and a final consistency check ensures that the same disparities are found in both directions. Moreover, spatial median filter and NCC matching costs thresholding are used to remove remaining outliers. Some embodiments implement the disparity estimation as CUDA kernel.

Calibration

While eliminating vertical disparities is necessary for proper human stereopsis, it is crucial for computational stereoscopic algorithms to work. In order to successfully work with a stereoscopic camera rig with motorized lenses and camera positions, high-quality calibration is indispensable. That is, the relative camera positions should differ only by a horizontal offset (interaxial distance) and the camera intrinsics must be known, in particular for varying focus and zoom settings.

Camera Intrinsics.

One example disparity calculation uses the camera focal length as input. Instead of relying on the lens markings, some embodiments perform an initial calibration for each camera-lens combination to compute its focal length, distortion coefficients, and principal points. For zoom lenses, some embodiments perform the calibration for a set different focal lengths. Some embodiments may interpolate these results depending on the current motor positions.

Camera Extrinsics.

The relative positions of the two cameras are first coarsely aligned by manually changing the camera orientations on the rig. In practice, looking at the red-cyan stereoscopic image quickly reveals coarse vertical disparities. The fine-tuning is done digitally in the rectification step: rectifying homographies are estimated from the epipolar geometry in real-time using feature matching and outlier removal tools. Certain approaches may work well for feature-rich scenes with non-zero interaxial distance and radially undistorted image pairs. For example, image correspondences may be used to estimate the fundamental matrix, from which corresponding homographies are computed.

Software Highlights

Plugins and Scripting.

Some embodiments of the disclosed plug-in system may use Windows DLL mechanisms to load plug-ins, the central stream manager object manages configuration and execution of plug-ins. Some embodiments may use LUA scripting for easy reconfigurability and extensibility, and LUAbind to expose C++ classes to the scripting language. The UI can be reconfigured easily using this scripting language. Moreover, the UI can be connected to different stream and control processing plug-ins as discussed supra.

Multi-Threading.

Some embodiments employ multi-threading to optimize overall system performance. The most important threads may include a DMA thread responsible for FPGA to host video transfer, a storage thread handling the data out, a thread for stream processing, and a control thread, and the event scheduler thread. Furthermore, all interfaces to external motors may be started separate threads in order to quickly react to events and to communicate efficiently with hardware controller boxes.

Hardware Components

FIG. 6 illustrates one embodiment of a stereoscopic camera system 600 that provides an experimental beam-splitter rig 100 which allows for fine camera and mirror tilt adjustments. FPGA frame grabber 610 acquires the image stream and performs pre-processing operations. CPU 620 and GPU 630 are then used to implement high-level computations and control. Image streams and/or metadata may be stored in non-transitory storage 640. In addition, user interface 650 displays the image streams and related information and transmits user input back to CPU 620; in one embodiment, the user input is captured by using a multi-touch touchscreen. An example embodiment of the system employs two synchronized Silicon Imaging SI-4000F color cameras, with a resolution of 2048×2048 and enables full-HD processing. An example embodiment uses a Birger EF mount for Canon EF lenses to be able to control focus and aperture electronically. Brackets may be mounted onto the zoom ring to also control the zoom electronically. Both cameras may be mounted on high precision rotary stages from Newport. Moreover, the right eye camera may be mounted on a high-precision linear stage from Newport to control interaxial distance. Although the speed of the linear stage is not very fast, all motors provide high accuracy and repeatability. An example embodiment of the computational system uses a six-core CPU paired with an NVIDIA GTX480 GPU. One embodiment employs a PCI-Express board with ALTERA Stratix III FPGAs as a frame grabber to pre-process video streams. A hardware RAID array of eight solid-state hard drives may be integrated in order to store the final video stream. A multi-touch overlay from PQLabs may be attached on top of a 120 Hz monitor, to form the user interface. Using NVIDIA 3D vision shutter glasses, a live S3D preview can be generated.

Application Examples

Automatic interaxial distance and convergence plane control is performed using the data from the disparity estimation in the stream analyzer. From the still images shown in FIGS. 7A-C, one can see how the controller properly adjusts the camera parameters to bring disparities into the desired range. However, reliable depth information is required for robust automatic control. In the present implementation, this may limit the frame rate and, in combination with the median filter, lead to the latency visible in the video. For relatively static scenes or for higher frame rates the additional low-pass filter can be used to smooth out the camera-parameter adjustments.

Figure 7A:
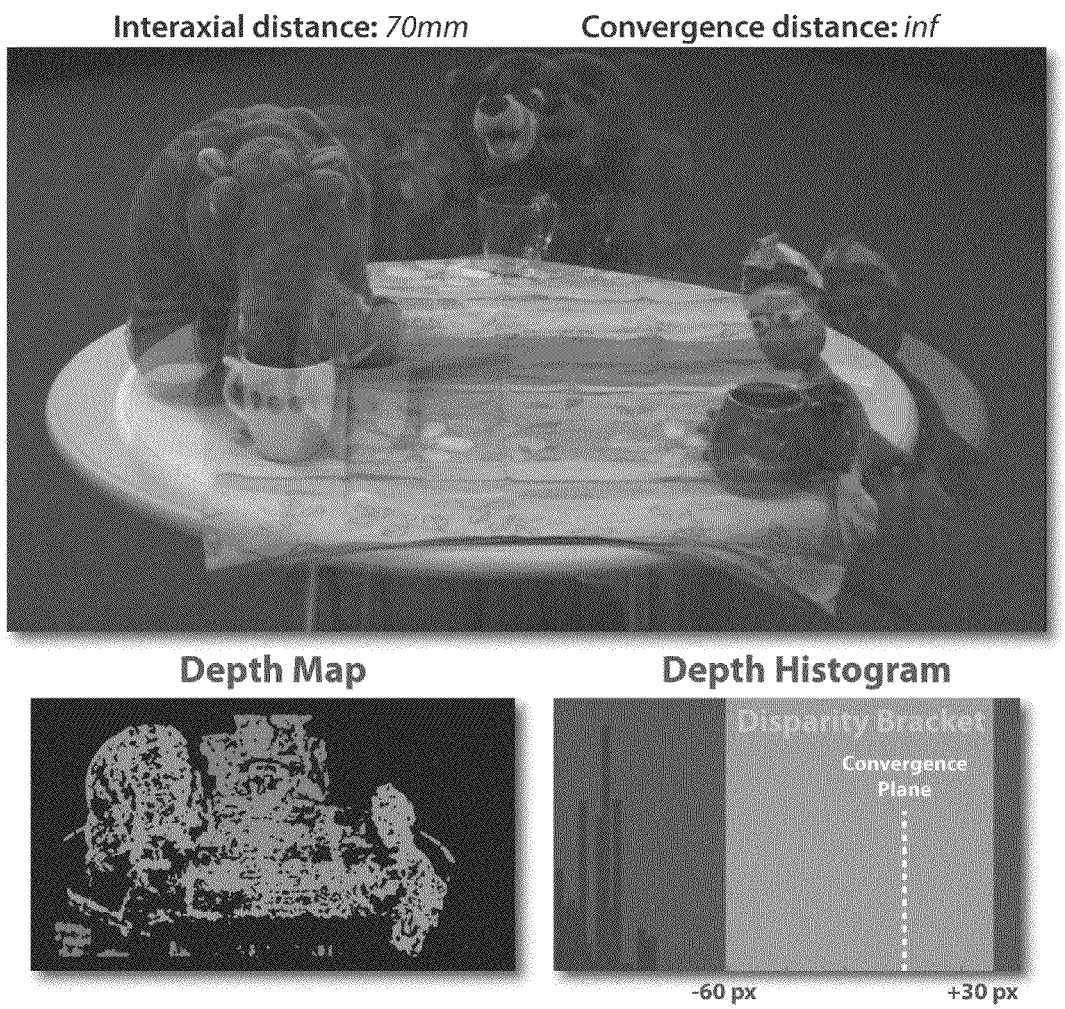

FIGS. 7A-C illustrate the effect of different interaxial and convergence settings. FIG. 7A shows a close-up scene shot using a wide interaxial distance (70 mm) and parallel cameras (infinite convergence distance), and produces huge disparities that fall outside of the desired disparity bracket and violate the stereoscopic comfort zone. In FIG. 7B, the interaxial distance is reduced drastically (to 22.6 mm) to reduce the disparities into the comfort zone (i.e., the desired disparity bracket). However, the overall depth range is not utilized fully. FIG. 7C shows the result after adjusting both the interaxial distance (to 125.2 mm) and the camera convergence distance (now 2.8 m instead of infinite), resulting in a more homogeneous disparity distribution due to the wide interaxial distance and near-convergence configuration.

Touch-based refocusing and convergence uses a simple template matching similar to the disparity estimation to determine the distance to a selected object. To improve stability and accuracy of the object-based estimate, a larger matching radius is used. The operator can specify the duration of the transition using the event scripting to create smooth effects.

Figure 8A:
FIGS. 8A-B include two examples of automatic control-based on template tracking.
Figure 8B:
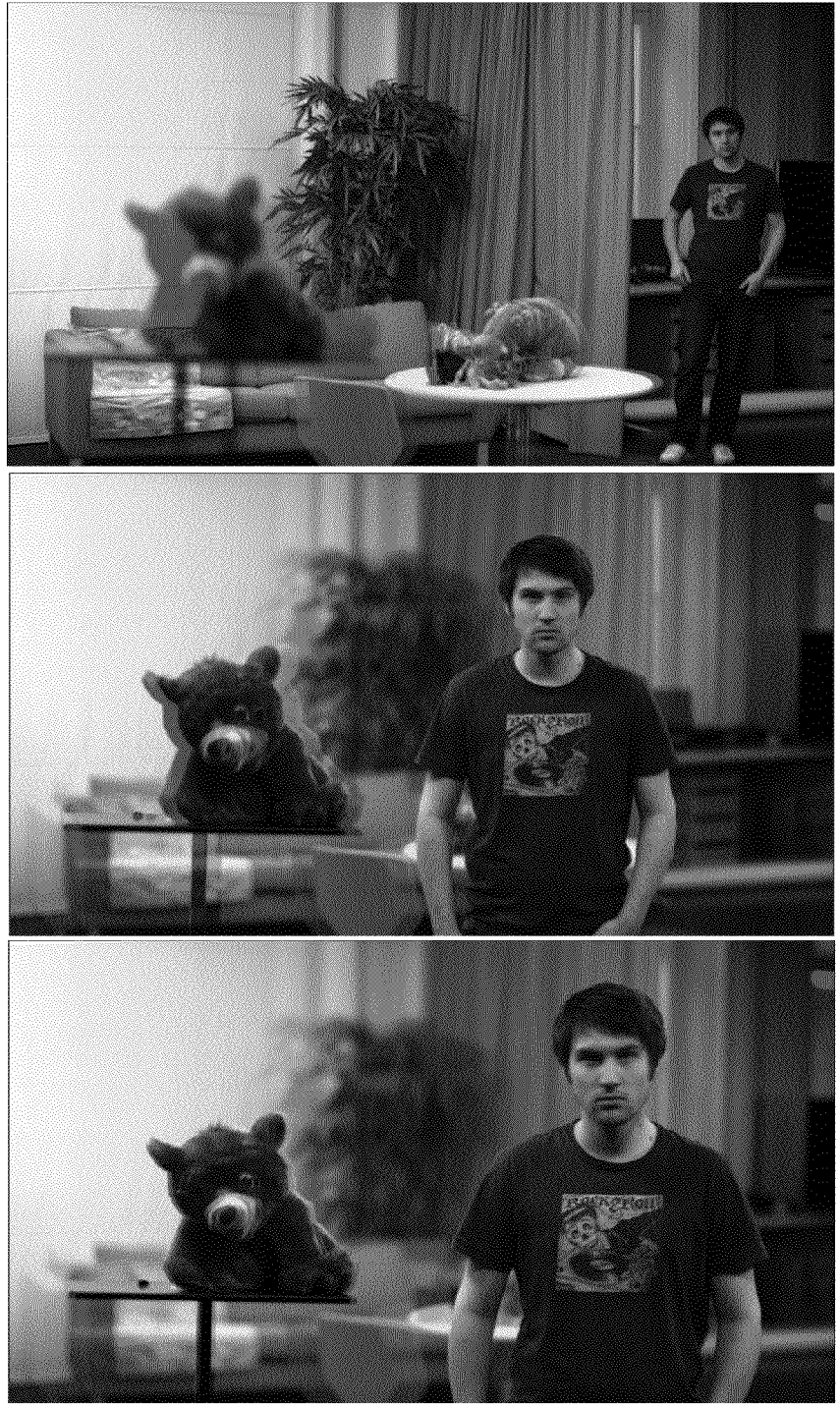

FIGS. 8A and 8B each show three representative frames for two different sequences, which represent two examples of automatic control based on template tracking. In FIG. 8A, the control module follows the convergence plane at the depth of the subject. In FIG. 8B, both convergence and focus are following the subject. Subject tracking for follow-focus and follow-convergence works very well in practice, despite the slow update rate of the employed tracker algorithm. While the tracker can lose an object when the background is similar to the subject, it performed well for the applications discussed above. The only manual interaction required is in the first frames of FIGS. 8A and 8B, in order to initialize the subject of interest.

Many other hardware and/or software configurations may be apparent to the skilled artisan which are suitable for use in implementing an invention presented within this disclosure or with various embodiments of an invention presented within this disclosure. For example, a computer system or information processing device may include a series of networked computers or clusters/grids of parallel processing devices. In still other embodiments, a computer system or information processing device may execute techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A stereo camera, comprising:
at least two lenses, each arranged to focus light on a respective camera sensor, wherein each camera sensor is capable of generating an image stream comprising a sequence of images;
a user interface to receive user input including:
a lower disparity range bracket setting for a target disparity range, and
an upper disparity range bracket setting for the target disparity range;
a stream analyzer comprising at least one processor and configured to:
receive the image streams; and
process the image streams and generate metadata including whether disparities in images of the image streams are outside of the target disparity range;
a control module comprising logic for generating, based on the metadata, control signals for one or more parameters relating to stereo camera control, wherein the one or more parameters relating to stereo camera control include an interaxial distance between the lenses and an angle formed by a principal axis of a lens with a baseline between the lenses; and
a control element that responds to the control signals for the one or more parameters relating to stereo camera control to alter at least one of the parameters relating to stereo camera control while the two or more image streams are being captured.

2. The stereo camera of claim 1, wherein the user interface includes a touchscreen input device and a stereographic display.

3. The stereo camera of claim 1 wherein principal axes of the lenses are coplanar and form a substantially same angle with the baseline, the angle with the baseline being adjustable.

4. A closed-loop control system for stereoscopic video capture, the system comprising:
at least two motorized lenses, wherein the lenses are positioned in accordance with specified parameters, wherein the specified parameters include an interaxial distance and an angle formed by a principal axis of a lens with a baseline between the lenses;
at least two light sensors, wherein each light sensor is coupled to a corresponding one of the at least two motorized lenses and the corresponding lens focuses light onto the light sensor, and wherein each light sensor generates an image stream comprising a sequence of images;
one or more processors;
a user interface to receive user input including:
a lower disparity range bracket setting for a target disparity range, and
an upper disparity range bracket setting for the target disparity range;
a stream analyzer for receiving the image streams from the light sensors, wherein the stream analyzer is operable to analyze the image streams and the specified parameters in real-time, generate metadata, including data related to disparities in the images of the image streams, and wherein the stream analyzer operates using the one or more processors;
a control module that operates using the one or more processors for receiving:
the user input received via the user interface, the image streams, and the metadata from the stream analyzer, wherein the control module is operable to:
analyze the user input, the image streams and the metadata, and
transmit control signals that update one or more of the specified parameters when the analysis of the user input, the image streams, and the metadata determines that disparities in images of the image streams are outside of the target disparity range; and
a control mechanism coupled to the at least two motorized lenses, wherein the control mechanism is operable to receive transmissions of the control signals from the control module and modify operation of the at least two motorized lenses in real-time in accordance with the updated one or more of the specified parameters while the two or more image streams are being captured.

5. The closed-loop control system of claim 4, wherein a specified parameter comprises a conventional camera parameter or a stereoscopic camera parameter.

6. The closed-loop control system of claim 5, wherein a conventional camera parameter comprises one or more of focus, zoom, aperture, shutter speed, exposure, frame rate, or region of interest.

7. The closed-loop control system of claim 4, further comprising a non-transitory computer readable medium coupled to the processor, the computer readable medium comprising code executable by the one or more processors for implementing one or more of fixed pattern noise reduction, pixel response correction, Bayer demosaicing, linear color correction, non-linear color correction, radial distortion correction, tangential distortion correction, gain correction, stereoscopic matching, disparity estimation, camera calibration, image rectification, image warping, feature matching, optical flow, alignment estimation, homography estimation, color correction estimation, or non-linear disparity mapping.

8. The closed-loop control system of claim 4, wherein metadata generated by the stream analyzer comprises one or more of statistical information, disparity information, or positional information.

9. The closed-loop control system of claim 4, wherein the control module transmits event data objects to the control mechanism in real-time, wherein an event data object is associated with an event, and wherein an event comprises an update of the one or more specified parameters at a specified time.

10. The closed-loop control system of claim 9, wherein the event data objects are added to an event queue.

11. The closed-loop control system of claim 9, wherein the event data objects in the event queue are executed in a specified order.

12. The closed-loop control system of claim 11, wherein the event data objects in the event queue are executed in an order specified in accordance with a priority of each event data object in the event queue.

13. The closed-loop control system of claim 9, wherein the specified time for an event is specified in relation to the current clock or in relation to a future exposure starting time.

14. The closed-loop control system of claim 9, wherein an event has a duration.

15. The closed-loop control system of claim 9, wherein the control module is operable to process events described in a script, further comprising:
a computing device operable to generate a script for programming camera operations using the control module.

16. The closed-loop control system of claim 4, further comprising:
a camera rig adjustably coupled to the control mechanism and to the at least two motorized lenses, wherein the camera rig supports the at least two motorized lenses, and wherein portions of the camera rig are movable to adjust the at least two motorized lenses in accordance with the updated specified parameters.

17. The closed-loop control system of claim 16, wherein portions of the camera rig are movable for rotationally adjusting the angle with the baseline of the principal axes of the at least two motorized lenses in accordance with a specified camera convergence.

18. The closed-loop control system of claim 16, wherein portions of the camera rig are movable for adjusting the at least two motorized lenses in accordance with a specified interaxial distance.

19. The closed-loop control system of claim 4, further comprising:
 a touch screen for displaying a user interface to control and monitor the closed-loop control system, wherein the user interface provides interaction metaphors that abstract underlying parameters, and wherein the touch screen is communicably connected to the one or more processors; and
 input circuitry operable to receive and process input signals from the touch screen and transmit information to the control module.

20. The closed-loop control system of claim 19, wherein the touch screen is approximately adjacent to the one or more processors.

21. The closed-loop control system of claim 19, wherein:
 the control module is further operable to receive user input from the input circuitry and to analyze the image streams and metadata from the stream analyzer together with the user input form the control circuitry to generate control information comprising a plurality of control events; and
 the control mechanism is further operable to adjust the two or more motorized lenses in real-time in response to the control events, wherein the adjusting modifies a camera convergence and an interaxial distance.

22. The closed-loop control system of claim 21, wherein the control module is further operable such that analyzing comprises processing the image streams using a set of plug-ins, wherein each plug-in in the set of plug-ins performs a specific function, and wherein the set of plug-ins can be re-programmed and thereby customized.

23. The closed-loop control system of claim 19, wherein an interaction metaphor comprises clicking on a region of the user interface and wherein the input circuitry is further operable to detect one or more clicks on the touch screen in a specific region of the user interface and to transmit user input related to the one or more clicks.

24. The closed-loop control system of claim 23, wherein the interaction metaphor comprises opening or closing a sub-menu, and wherein the user interface further includes sub-menu functions provided in relation to the one or more clicks on the touch screen.

25. The closed-loop control system of claim 23, wherein the interaction metaphor comprises toggling a control in the user interface, and wherein the user input comprises an updated setting for the control.

26. The closed-loop control system of claim 19, wherein an interaction metaphor comprises operating a virtual slider in the user interface, wherein the user interface is further operable to:
 detect, using the input circuitry, a click on the touch screen in a specific region of the user interface, wherein the specific region corresponds to a slider;
 provide a virtual slider in the user interface, wherein the virtual slider encompasses a substantially larger area of the touch screen;
 detect, using the input circuitry, a sliding gesture in a region of the touch screen corresponding to the virtual slider, wherein the scale of the sliding gesture is proportionally mapped to determine an updated slider setting; and
 transmit user input related to the sliding gesture, wherein the user input comprises the updated slider setting.

27. The closed-loop control system of claim 26, wherein the input circuitry is further configured such that detecting the click comprises detecting a click on the slider by a first finger and such that detecting the sliding gesture comprises detecting a sliding gesture by a second finger.

28. The closed-loop control system of claim 26, wherein the interaction metaphor comprises adjusting a camera parameter, wherein the camera parameter comprises one of a conventional camera parameter or a stereoscopic camera parameter, and wherein the user input comprises an updated value for the camera parameter.

29. The closed-loop control system of claim 19, wherein an interaction metaphor comprises performing a click-combination gesture, wherein the user input comprises a first click-combination gesture, and wherein the input circuitry is further configured to:
 detect a first gesture on the touch screen in a specific region of the user interface, wherein the first gesture comprises a click, and wherein the specific region corresponds to a first button;
 detect a second gesture on the touch screen in a specific region of the user interface; and
 transmit user input related to the first click-combination gesture.

30. The closed-loop control system of claim 29, wherein the input circuitry is further configured such that detecting the first gesture comprises detecting that a first finger remains in contact with the first button and detecting the second gesture comprises detecting that the second gesture is performed by a second finger.

31. The closed-loop control system of claim 30, wherein the user input comprises a second click-combination gesture and wherein the input circuitry is further configured to:
 detect a third gesture on the touch screen in a specific region of the user interface, wherein the first finger remained in contact with the first button from before the second gesture until after the third gesture; and
 transmit user input related to the second click-combination gesture.

32. The closed-loop control system of claim 29, wherein a click-combination gesture comprises selecting a screen object, wherein the control module is further operable to use the user input to compute a camera convergence in relation to a screen object.

33. The closed-loop control system of claim 4, wherein the user interface includes a touchscreen input device and a stereographic display.

34. The closed loop control system of claim 4 wherein principal axes of the lenses are coplanar and form a substantially same angle with the baseline, the angle with the baseline being adjustable.

* * * * *